United States Patent [19]
Ferguson

[11] Patent Number: 5,431,523
[45] Date of Patent: Jul. 11, 1995

[54] REMOTE CONTROL FOR A RECIPROCATING VEHICLE BED CONVEYOR FLOOR

[75] Inventor: Robert P. Ferguson, Leesburg, Ind.

[73] Assignee: Ferguson Farms, Inc., Leesburg, Ind.

[21] Appl. No.: 120

[22] Filed: Jan. 4, 1993

[51] Int. Cl.[6] .............................................. B65G 25/04
[52] U.S. Cl. .................................. 414/525.9; 414/909; 414/525.1; 198/750.5
[58] Field of Search .................. 414/525.1, 525.9, 909; 198/750

[56] References Cited

U.S. PATENT DOCUMENTS

| | | | |
|---|---|---|---|
| 4,096,960 | 6/1978 | Gilmore | 414/909 X |
| 4,184,587 | 1/1980 | Hallstrom | 198/750 |
| 4,345,869 | 8/1982 | King | 414/909 X |
| 4,492,303 | 1/1985 | Foster | 414/525.9 X |
| 4,793,468 | 12/1988 | Hamilton et al. | 414/525.9 X |
| 4,856,645 | 8/1989 | Hallstrom, Jr. | 198/750 |

*Primary Examiner*—Michael S. Huppert
*Assistant Examiner*—Stephen Gordon
*Attorney, Agent, or Firm*—Baker & Daniels

[57] ABSTRACT

A reciprocating conveyor being switchable between an operation mode and an interrupt mode by an RF remote control. An electric valve communicates between a hydraulic drive pump and a reciprocating switch valve to provide a bypass for a pressurized fluid. A hand held transmitter produces a signal which is received by a receiver. The receiver cause the actuation of the electric valve between open and closed positions.

6 Claims, 2 Drawing Sheets

REMOTE CONTROL FOR A RECIPROCATING VEHICLE BED CONVEYOR FLOOR

This invention relates to reciprocating conveyors and more particularly to a vehicle, such as a truck or trailer, bed mounted reciprocating conveyor, which includes a remote control to switch the conveyor from an operation mode to an interrupt mode from a distance.

BACKGROUND OF THE INVENTION

Reciprocating slat conveyors or "shuffle floor" conveyors for vehicle beds have been disclosed in various U.S. Pat. Nos. including: U.S. Pat. Nos. 4,184,587; 4,144,963; 4,691,819 and 4,856,645. Reciprocating slat conveyors use groups of multiple slats moving horizontally relative to each other or with the slats of each group moving simultaneously in one direction and sequentially in the opposite direction. This arrangement provides step-wise movement of material across the conveyor floor. The slats are reciprocated on a framework by a hydraulic drive system mounted beneath the framework. The control devices for the drive system are mounted to the vehicle and generally located in the approximate vicinity of the drive system. In most applications, the user needs to monitor the discharge of the material coming off the conveyor. For example, a user needs to monitor grain coming off the conveyor at the end of the bed into a hopper of an auger to prevent overflows. With conveyor controls inconveniently located away from the discharge end or from the user's point of observation, the user must travel back and forth from the end of the beds to the vehicle mounted controls to start and stop the reciprocating action of the conveyor.

SUMMARY OF THE INVENTION

The reciprocating vehicle bed conveyor of this invention includes a remote control apparatus to allow a user to remotely switch the conveyor between an operation mode and an interrupt mode. The remote control device uses a hand held transmitter for sending a RF signal to a receiver mounted to the framework of the conveyor. The receiver upon receiving the RF signal causes the activation or one or more relays. These relays electrically actuate the reversible drive motor of an electric control valve. The control valve is positioned in the hydraulic drive system of the shuffle floor between the actuating drive pistons and drive pump. The control valve alternatively switches the drive mechanism between its interrupt and operation modes.

In the operating mode, the control valve is closed forcing the pressurized fluid flow to reciprocate the drive pistons. In the interrupt mode, the control valve is open which allow the fluid flow to bypass the drive pistons and recirculate back through the drive pump. Using the control valve, the reciprocation of the slats can be halted without shutting down the operation of the hydraulic drive mechanism.

Accordingly, an object of this invention is to provide for a reciprocating vehicle bed conveyor floor which can be remotely switched between interrupt and operation modes, while maintaining the operation of the hydraulic drive mechanism.

Another object of this invention is to provide a reciprocating vehicle bed conveyer floor with a remote control.

Other objects of this invention will become apparent upon a reading of the following description taken with the accompanying drawings.

DESCRIPTION OF THE PREFERRED EMBODIMENT

The preferred embodiment herein disclosed is not intended to be exhaustive or to limit the application to the precise forms disclosed. Rather it is chosen and described in order that others skilled in the art might utilize its teachings.

Figure 1:
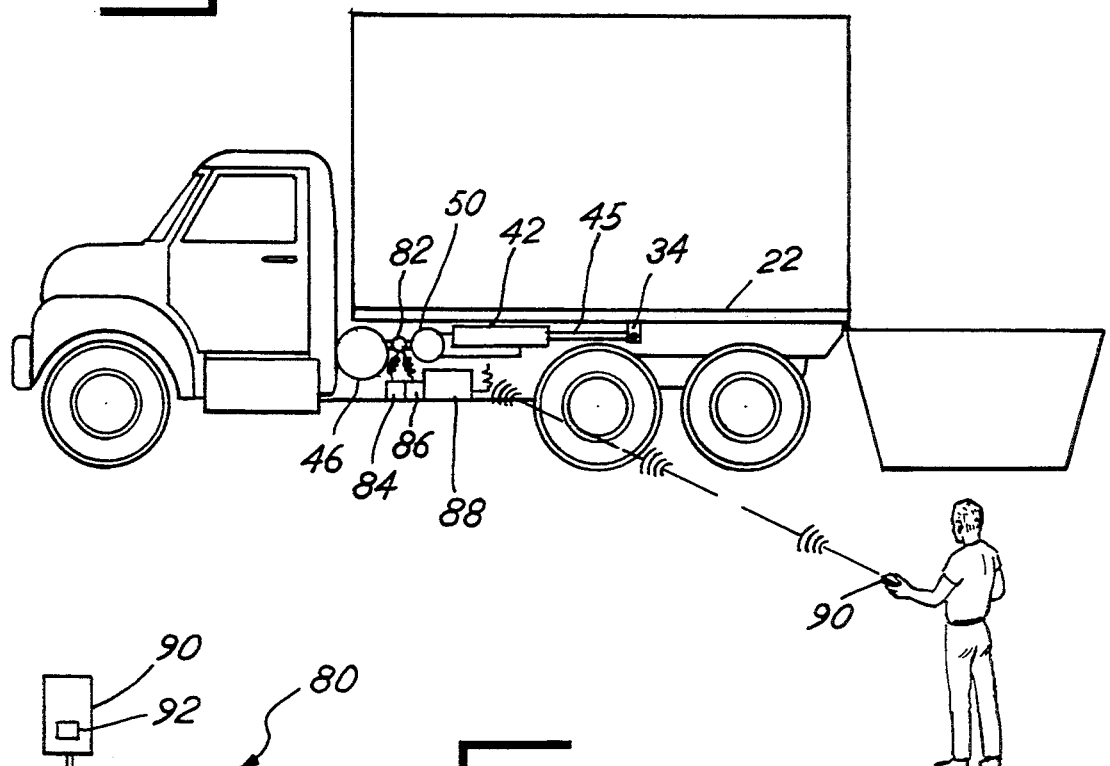
FIG. 1 is a perspective of the remote controlled reciprocating conveyer of this invention used in a truck.

The reciprocating conveyor 10 of this invention can be utilized in a variety of industrial applications, such as the load supporting bed of a truck, as shown in FIG. 1. Reciprocating conveyor 10 includes a conveyor or shuffle floor 12 supported by a framework 20. Preferably, framework 20 includes laterally spaced side beams 22 interconnected by cross beams 24. A plurality of laterally spaced parallel guide beams 26 are supported by cross beams 24 and extend the length of framework 20. Guide members 26 are secured to cross beams 24 by any conventional methods, such as welding.

Figure 2:
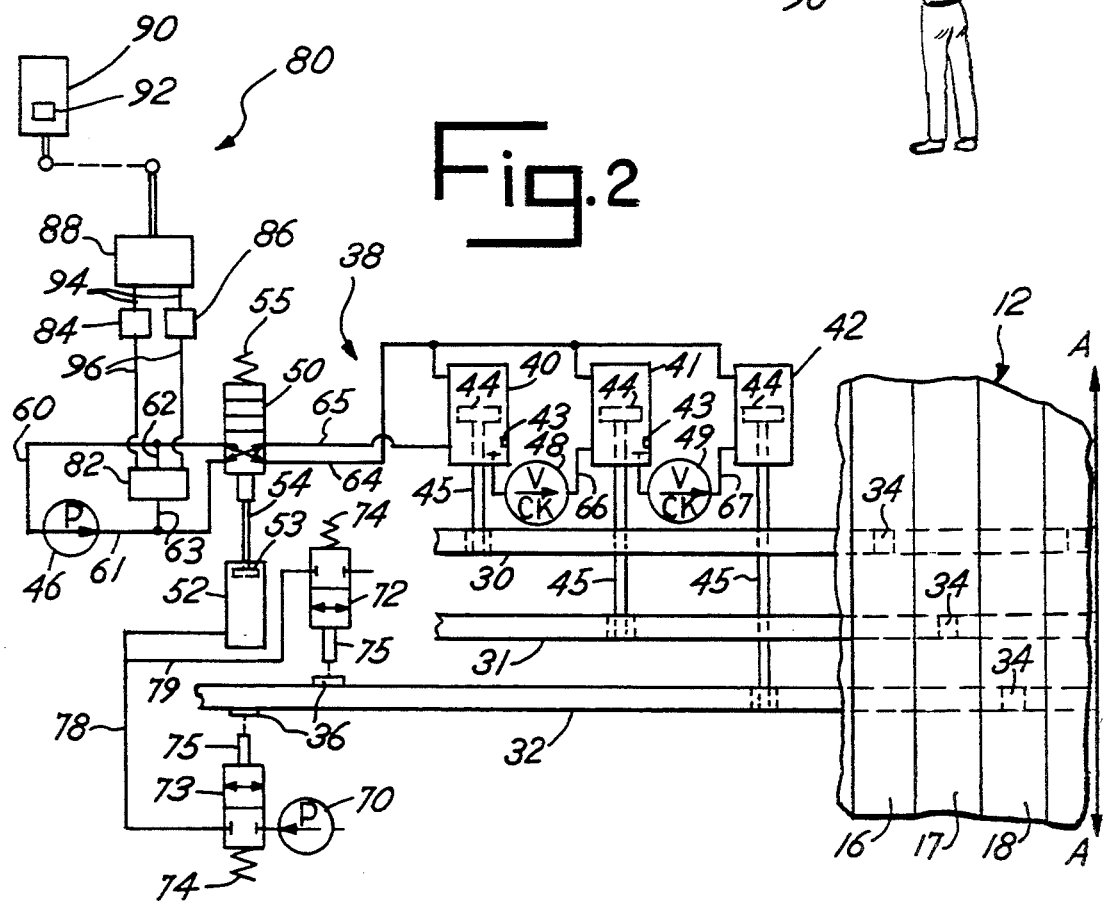
FIG. 2 is a schematic of the hydraulic pressure system, remote control system and conveyor floor to illustrate the operation of the conveyor floor.
Figure 3:
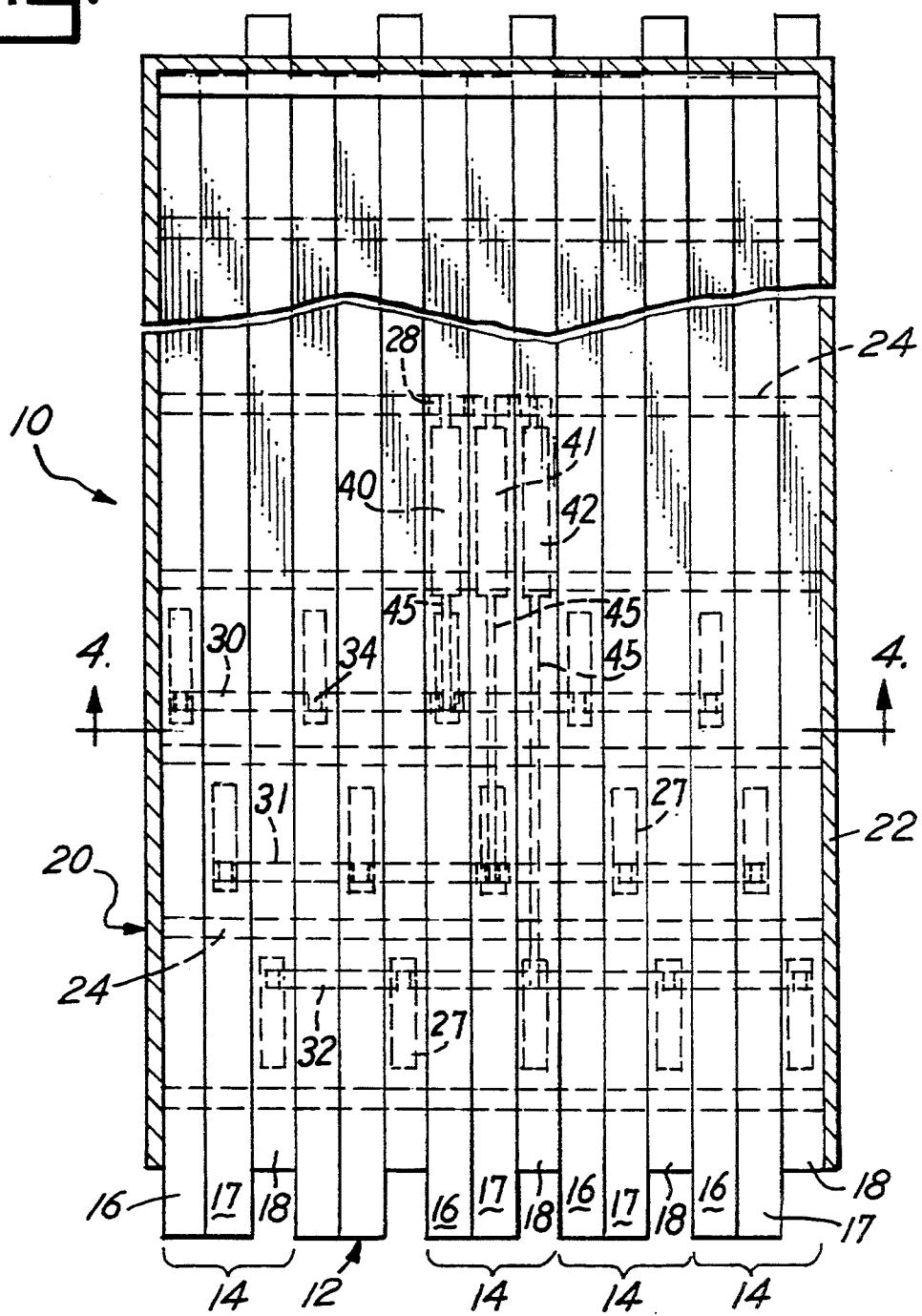
FIG. 3 is a top plan view of the conveyor floor.
Figure 4:
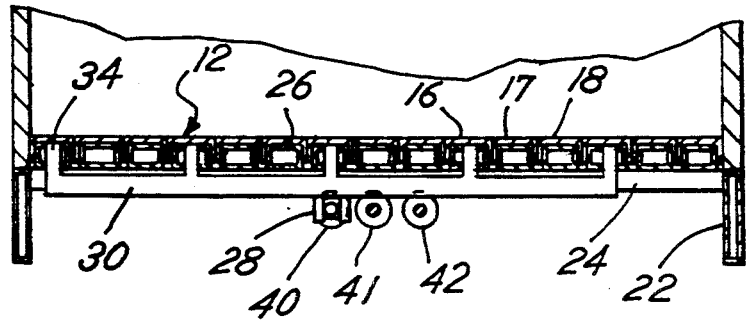
FIG. 4 is a sectional view of the conveyor floor taken along line 4—4 of FIG. 3.

Shuffle floor 12 is preferably formed by groups 14 of multiple elongated slats arranged side-by-side longitudinally in the direction of the conveying movement (A—A). As shown in FIGS. 2-4, each slat group 14 has three conveyor slats 16, 17 and 18. It is to be understood that shuffle floor 12 may consist of any number of conveyor slat groups 14, and any slat group 14 may include any number of conveyor slats in excess of two. Each of the elongated conveyor slats slidably fit within a guide member 26 for longitudinal reciprocation relative thereto.

One conveyor slat 16, 17, 18 of each group 14 is interconnected for simultaneous longitudinal reciprocation by one of three transverse drive beams 30, 31 and 32. As shown in FIG. 3, transverse drive beams 30, 31 and 32 underlie the conveyor slats between two adjacent cross beams 24 in which port ions of the longitudinal guide members 26 have been cut away. Each drive beam 30, 31 and 32 is provided with a plurality of laterally spaced brackets 34 which extend upward through cut-away portions or slots 27 in guide members 26 for attachment to its associated slat. Brackets 34 on drive beam 30 secure all of slats 16 of the plurality or groups together; brackets 34 on drive beams 31 secure all of slats 17 together; and brackets 34 on drive beam 32 secure all of slats 18 together.

Fluid pressure drive system 38 is provided for sequentially reciprocating the conveyor slats of each group 14 simultaneously between a start position in an aft load conveying direction and a forward load pick up direction. This mode of operation insures efficient movement of all types of loads in a desired conveying direction to the rest of the truck bed. Each of drive beams 30, 31 and 32 is connected to a fluid source of drive system 38 for reciprocative movement in the longitudinal aft and forward direction of the conveyor.

As shown in FIGS. 3 and 4, drive beams 30, 31 and 32 are connected pivotally by conventional methods, such as pins, to the projecting ends of piston rods 45 extending from fluid pressure drive cylinders 40, 41 and 42, respectively. The ends of the drive cylinders opposite piston rods 45 are mounted pivotally by conventional methods, such as pins, to braces 28 secured to framework 20. The inner ends of the piston rods 45 are connected to pistons 44 (see FIG. 2) which are reciprocated in the drive cylinders upon application of fluid pressure, preferably hydraulic, within the cylinders.

FIG. 2 illustrates fluid pressure drive system 38 associated with drive cylinders 40, 41 and 42 for errecting selective reciprocation of pistons 44 and connected rods 45 to provide load conveying motion of the slats in the direction indicated by arrow A—A. Fluid pressure drive pump 46 is provided with an inlet conduit 60 and an outlet conduit 61. Reciprocating valve 50 functions to communicate conduits 60 and 61 interchangeably with conduits 64 and 65 to produce the reciprocating motion of the slats. Conduit 64 communicates with the base end of each of drive cylinders 40, 41 and 42, while conduit 65 communicates with the piston rod end of each drive cylinder.

The piston rod end of drive cylinder 40 communicates with the piston rod end or drive cylinder 41 through conduit 66 and check valve 48. In similar manner, the piston rod end of drive cylinder 41 communicates with the piston rod end of cylinder 42 through conduit 67 and check valve 49. Check valves 48 and 49 prevent fluid pressure flow in the direct ion opposite the flow arrows therein until piston rods 45 of drive cylinders 40, 41 and 42 become extended. When so extended, each piston 44 engages a check valve operator 43 within its associated drive cylinder to switch check valves 48 and 49 to allow directional reverse flow.

With reciprocating valve 50 positioned as shown in FIG. 2, pressurized fluid from drive pump 46 is directed through conduits 61 and 65 to the piston rod end of cylinder 40 to initiate retraction of its associated piston rod 45 and drive beam 30. Simultaneously, fluid pressure from conduit 65 passes through check valve 48 and conduit 66 into the piston rod end of cylinder 41 and through check valve 49 and conduit 67 into the piston rod end of cylinder 42. By virtue of the foregoing sequence, all of the drive beams move simultaneously in the same direction, i.e., in the direction of simultaneous retraction of piston rods 45.

In the switched position of reciprocating valve 50, fluid pressure from drive pump 46 is communicated through conduits 61 and 64 to the base ends of cylinders 40, 41 and 42, while conduits 60 and 65 communicate the piston rod end of cylinder 40 with the exhaust side of drive pump 46. Since the piston rod end of cylinders 41 and 42 are closed by virtue of check valves 48 and 49, only piston rod 45 of cylinder 40 is caused to extend. Upon reaching its maximum limit of extension, piston 44 of cylinder 40 engages operator 43 of cylinder 40. Operator 43 of cylinder 40 switches check valve 48 to allow fluid flow from the piston rod end of cylinder 41 through conduit 66 and check valve 48 into conduits 65 and 60 and the exhaust side of drive pump 46. Thus, piston rod 45 of cylinder 41 is caused to extend. Upon reaching its limit of extension, piston 44 of cylinder 41 engages operator 43 of cylinder 41. Operator 43 of cylinder 41 switches check valve 49 to allow fluid flow from the piston rod end of cylinder 42 through check valves 49 and 48 and conduits 67, 66, 65 to the exhaust side of drive pump 46. Piston rod 45 of cylinder 42 is thus caused to extend. By virtue of the foregoing sequence, all the drive beams move in a sequential manner in the same direction as the extension of the piston rods 45.

The travel of the slats is controlled preferably by a pneumatic system, but any conventional method can be incorporated. Reciprocating valve 50 is connected to piston rod 54 of a switching cylinder 52 and biased by spring 55. Switching cylinder 52 is supplied with pressurized air flow by a pneumatic pump 70 through conduit 78. Travel control valves 72 and 73 each include a contract piston 75 biased by a loading spring 74. Travel control valves 72 and 73 are positioned for selective actuation with a pad 36 mounted on opposite sides of drive beam 32. Travel control valves 72 and 73 trigger the switching of reciprocating valve 50 when drive beam 32 reaches the extremities of its reciprocating motion. When drive beam 32 reaches the position of full extension of the piston rod 45 associated with cylinder 42, travel control valve 73 will be switched from the closed position illustrated, against the resilient resistance of its loading spring 74 into an open position, which allows pump 70 to send a pressurized air flow through conduit 78 to fill switching cylinder 52. Filling switching cylinder 52 extends rod 54 against the resilient resistance of its loading spring 55 to switch reciprocating valve 50 to cause conduit 65 to become the inlet and conduit 64 to become the outlet. When drive beam 32 reaches the position or full retraction, travel control valve 72 will be switched from the position illustrated, against the resilient resistance of its load spring 74 into an open position, which allows the pressurized air in switching cylinder 52 to escape to atmosphere through conduit 79. Loading spring 55 moves piston 53 against the releasing air pressure and switches reciprocating valve 50 back to its original position, causing conduit 65 to become the outlet and conduit 64 to become the inlet.

An electric control valve 82 is positioned in fluid pressure drive system 38 and connected between conduits 60 and 61 by conduits 62, 63. Control valve 82 is shifted between an open and closed position upon the introduction of an electrical current into a selected one of its input leads 96. In its closed position, control valve 82 causes the pressurized fluid to circulate about conduits 60, 61, 64 and 65 between drive pump 46 and drive cylinders 40, 41, 42 through reciprocating valve 50. Since the load on shuffle floor 12 naturally creates a static resistance to the pressurize fluid flow, control valve 82 when in its closed position allows pressurized fluid flow to circulate only around conduits 60, 61 through conduits 62 and 63. Naturally following the path of least resistance, the pressurized flow bypasses reciprocating valve 50 and the rest of drive system 38 and circulates continuously between drive pump 46 and open control valve 82, with the floor movement being interrupted.

As shown in FIGS. 1 and 2, a remote control device 80 is provided which includes a signal receiver 88 mounted beneath truck framework 20 and a hand held transmitter 90 held by a user. Transmitter 90 is conventionally designed and includes an actuation switch 92. Depressing switch 92 triggers transmitter 90 to emit a RF signal which is received by receiver 88. Receiver 88 is electrically coupled to an on-relay 84 and an off-relay 86 by wiring 94. Relays 84 and 86 are electrically connected to a control valve 82 by valve leads 96. The electrical power for the receiver, relays, and control valve is supplied by the truck electrical system.

In operation with the pumps activated and any manual operating switch placed in its "on" position, drive system 38 is initially in its interrupt mode with drive pump 46 circulating the pressurized fluid through the open control valve 82. Transmitter 90 is carried by the user to a remote location, such as near the discharge end of the truck bed. By depressing its switch 92, the transmitter transmits an RF signal pulse to receiver 88. Receiver 88 activates the on-relay 84. On-relay 84 when switched on causes an electric current to activate switching valve 82 into its closed position. Upon the valve reaching its closed position, relay 84 is deactivated. When valve 82 is in its closed position, the pressurized fluid passes through reciprocating valve 50 and drives the slats, producing the operational mode. By depressing its switch 92 a second time, transmitter 90 transmits a second pulse to receiver 88 which activates the off-relay 86. Off-relay 86 when switched on causes an electric current to activate switching control valve 82 into its open position. Upon the valve reaching its open position, relay 86 is deactivated. When valve 82 is in its open position, the pressure fluid recirculates through valve connecting conduits 62 and 63, producing the interrupt mode without halting the operation of the pump.

It should be understood that the invention is not to be limited to the precise form disclosed but may be modified within the scope of the appended claims.

What I claim is:

1. A reciprocating vehicle bed conveyor comprising:
   a frame forming a part of a bed of a vehicle,
   a plurality of elongated parallel slats carried in said bed upon said frame,
   drive means for imparting longitudinal reciprocating movement to said slats relative to said frame, wherein said drive means are mounted to said frame and connected to said slats, and wherein said drive means are responsive to a pressurized fluid,
   source means for supplying the pressurized fluid to said drive means,
   conduit means, connecting said source means and said drive means, for circulating said pressurized fluid between said source means and said drive means,
   valve means for interrupting said pressurized fluid circulation between said source means and said drive means when said valve means is in an open position to thereby interrupt longitudinal reciprocating movement of said slats relative to said frame, wherein said valve means is connected with said conduit means at a position along said conduit means between said source means and said drive means, and wherein said valve means may be shifted between a closed position and said open position, and
   electrical control means for shifting said valve means between said open and closed positions, said control means including receiver means whereby said valve means may be actuated from a location remote from the vehicle.

2. The conveyor of claim 1 wherein said control means includes:
   a portable transmitter means for emitting an electrical signal, and
   wherein said receiver means is operatively associated with said valve means, supported by said frame, and operative to receive said signal from said transmitter means to cause said valve means to be shifted between its open and closed positions.

3. The conveyor of claim 2 further comprising actuation means, electrically coupled to said receiver means and said valve means, for shifting said valve means between its said open position and said closed position upon receipt of said signal by said receiver means.

4. The conveyer of claim 3 wherein said actuation means includes relay means, associated with said valve means, for connecting a power source to said valve means.

5. The conveyor of claim 4 wherein said relay means includes an on-relay and an off-relay, said receiver means responsive to a first said signal, said receiver means having output means connected to said on-relay for actuation of said on-relay upon reception of said first emitted signal, said receiver means responsive to a second said signal, said receiver means having output means connected to said off-relay for actuation of said off-relay upon receipt of said second emitted signal.

6. The conveyor of claim 1 wherein said conduit means includes first and second conduit parts connected between said source means and said drive means, said first conduit part constituting means for circulating said pressurized fluid from said source means to said drive means, said second conduit part constituting means for circulating said pressure fluid from said drive means to said source means, and
   wherein said valve means is communicatively connected to said first and second conduit parts at a position between said source means and said drive means, whereby said pressurized fluid circulates between the source means and the drive means when said valve means is disposed in said closed position, and whereby said pressurized fluid circulates only between said source means and the valve means when the valve means is disposed in said open position.

* * * * *